United States Patent
Venkatraman et al.

(10) Patent No.: US 10,659,921 B2
(45) Date of Patent: May 19, 2020

(54) MEASUREMENT BATCHING

(71) Applicant: QUALCOMM Incorporated, San Diego, CA (US)

(72) Inventors: Sai Pradeep Venkatraman, Santa Clara, CA (US); Dominic Gerard Farmer, San Jose, CA (US); Aditya Srivastava, Fremont, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 15/275,156

(22) Filed: Sep. 23, 2016

(65) Prior Publication Data

US 2018/0091946 A1 Mar. 29, 2018

(51) Int. Cl.
| | |
|---|---|
| *H04W 4/02* | (2018.01) |
| *G01S 5/02* | (2010.01) |
| *H04W 4/029* | (2018.01) |
| *H04L 12/26* | (2006.01) |
| *H04L 29/06* | (2006.01) |

(52) U.S. Cl.
CPC ........... *H04W 4/025* (2013.01); *G01S 5/0252* (2013.01); *H04L 43/065* (2013.01); *H04L 67/42* (2013.01); *H04W 4/029* (2018.02)

(58) Field of Classification Search
CPC combination set(s) only.
See application file for complete search history.

(56) References Cited

U.S. PATENT DOCUMENTS

| | | |
|---|---|---|
| 6,522,266 B1 | 2/2003 | Soehren et al. |
| 7,388,541 B1 | 6/2008 | Yang |
| 8,102,784 B1 | 1/2012 | Lemkin et al. |
| 8,514,131 B2 | 8/2013 | Jovicic et al. |

(Continued)

FOREIGN PATENT DOCUMENTS

| | | |
|---|---|---|
| WO | 2013065042 A1 | 5/2013 |
| WO | 2014093533 A2 | 6/2014 |
| WO | 2016137661 A1 | 9/2016 |

OTHER PUBLICATIONS

International Search Report and Written Opinion—PCT/US2017/052077—ISA/EPO—dated Jan. 9, 2018.

(Continued)

*Primary Examiner* — Steven S Kelley
(74) *Attorney, Agent, or Firm* — Thien T. Nguyen

(57) ABSTRACT

Method, mobile device, computer program product, and apparatus for performing Fine Grain Position Data Collection is described. In one aspect a mobile device performs measurement batching of data, for example positioning and AP measurement data. In some aspects, the mobile device processes positioning and AP measurement data in response to a batch trigger. The mobile device may send the processed measurement batch to a server for analysis or processing. A batch trigger may include receiving a positioning fix with high confidence such that the mobile device may backfilter or otherwise correct mobile sensor based positioning data associated with AP measurements. The server may interpret the data from the measurement batches identified from a number of different mobile devices to calculate position of APs within an environment.

22 Claims, 6 Drawing Sheets

(56) References Cited

U.S. PATENT DOCUMENTS

| | | |
|---|---|---|
| 2006/0019679 A1 | 1/2006 | Rappaport et al. |
| 2010/0014443 A1 | 1/2010 | Cristian et al. |
| 2010/0130229 A1 | 5/2010 | Sridhara et al. |
| 2011/0090081 A1 | 4/2011 | Khorashadi et al. |
| 2011/0117924 A1* | 5/2011 | Brunner ............... G01S 5/0252 455/456.1 |
| 2011/0250903 A1 | 10/2011 | Huang et al. |
| 2011/0306365 A1* | 12/2011 | Wirola ............... H04B 17/0072 455/456.6 |
| 2012/0133555 A1 | 5/2012 | Hyun |
| 2013/0018629 A1 | 1/2013 | Sidhu et al. |
| 2013/0116966 A1 | 5/2013 | D'Jesus Bencci et al. |
| 2013/0281111 A1 | 10/2013 | Syrjarinne et al. |
| 2013/0307723 A1 | 11/2013 | Garin et al. |
| 2013/0344886 A1 | 12/2013 | Jarvis et al. |
| 2014/0011518 A1 | 1/2014 | Valaee et al. |
| 2014/0073363 A1 | 3/2014 | Tidd et al. |
| 2014/0221005 A1 | 8/2014 | Marshall et al. |
| 2014/0335894 A1* | 11/2014 | Wirola ............... H04W 64/00 455/456.1 |
| 2015/0133152 A1* | 5/2015 | Edge ............... G01S 5/0036 455/456.1 |
| 2015/0198721 A1 | 7/2015 | Waters et al. |
| 2015/0237595 A1 | 8/2015 | Le Grand et al. |
| 2015/0327009 A1* | 11/2015 | Vilppula ............... G01S 5/0257 455/457 |
| 2016/0029224 A1* | 1/2016 | Edge ............... G01S 5/0252 455/456.1 |
| 2016/0088440 A1 | 3/2016 | Palanki et al. |
| 2016/0308865 A1* | 10/2016 | Poli ............... H04L 63/0876 |

OTHER PUBLICATIONS

Alzantot M., et al., "CrowdInside: Automatic Construction of Indoor Floorplans," arXiv:1209.3794v1 [cs.OH], Sep. 17, 2012, 11 pages.

Jimenez A.R., et al., "A Comparison of Pedestrian Dead-Reckoning Algorithms using a Low-cost MEMS IMU," Intelligent Signal Processing, 2009. WISP 2009. IEEE International Symposium on, IEEE, Piscataway, NJ, USA, Aug. 26, 2009 (Aug. 26, 2009), pp. 37-42, XP031546088, ISBN: 978-1-4244-5057-2.

\* cited by examiner

MEASUREMENT BATCHING

FIELD

The subject matter disclosed herein relates generally to client and server data collection and distribution, and more specifically batching positioning data and access point measurement data.

BACKGROUND

Electronic devices may include a variety of sensors and inputs to monitor and infer relative device position. For example, based on input received by a WiFi sensor, a device can measure Received Signal Strength Indication (RSSI) or Round Trip Time (RTT) to infer device position relative to one or more wireless access points. In another example, a Global Navigation Satellite System (GNSS) can be used to determine device position. Through a combination of device measurements, Access Point (AP) locations may be determined within an environment.

Current techniques for wireless AP location mapping typically have reduced effectiveness when accurate mobile device position fixes are unavailable. For example, instead of referencing actual GNSS positions in proximity to AP measurements, typical techniques for mapping APs (for example, WiFi and/or BlueTooth (BT) APs) may calculate a weighted mean of Global Navigation Satellite System (GNSS) positions available at the times APs measurements are observed. However, relying on a weighted mean for positions can lead to less accurate indoor AP mapping when AP measurement data is associated with a number of missing GNSS signals, such as may occur indoors or when satellite reception is unreliable. Also, because traditional mobile positioning is often less accurate indoors, BT APs which may be predominantly indoors, are mapped less frequently and with less accuracy.

Another technique for determining AP locations includes AP map fingerprinting by a specialized testing engineer for each AP location. However, testing engineers may be expensive and time consuming to deploy and is not readily scalable to many locations.

Data collection servers may process and redistribute position information collected by a number of electronic devices (for example, crowdsourcing). However, always on data collection by electronic devices may consume limited device resources while providing data to the data collection server. For example, when the device is a mobile device that uses battery power, data collection can consume some of the limited battery resources of the device as one or more sensors gather data. Furthermore, reporting data out to a collection server or other device can also consume limited wireless bandwidth resources. For example, users may have a data bandwidth cap and may be charged excess usage fees when data use exceeds the cap. Additionally, clients may send erroneous data to servers and quality of data received from mobile devices may not be easily verifiable. Therefore, new and improved data collection techniques are desirable.

SUMMARY

Embodiments disclosed herein may relate to a device for performing measurement batching of data, such as positioning and AP measurement data. In some embodiments, the mobile device processes positioning and AP measurement data in response to a batch trigger and sends the processed measurement batch to a server for further analysis. The server may interpret the data from the measurement batches identified from a number of different mobile devices to calculate position of APs within an environment.

Embodiments disclosed herein may relate to a mobile device to batch measurement data. The mobile device comprises a memory and a processor coupled to the memory. Together, the process and memory are configured to: collect, beginning at a baseline position, positioning data and wireless measurement data; determine a new position of the mobile device and a confidence measure associated with the new position of the mobile device; and define a data batch for sending to a server in response to a data batch trigger, where the data batch includes positioning data and AP measurement data collected between the baseline position and the new position, and where the confidence measure associated with the new position of the mobile device meets or exceeds a threshold confidence.

Embodiments disclosed herein may relate to a method for measurement batching at a mobile device, the method comprising: collecting, beginning at a baseline position, positioning data and wireless measurement data; determining a new position of the mobile device and a confidence measure associated with the new position of the mobile device; and defining a data batch for sending to a server in response to a data batch trigger, where the data batch includes positioning data and AP measurement data collected between the baseline position and the new position, and where the confidence measure associated with the new position of the mobile device meets or exceeds a threshold confidence.

Embodiments disclosed herein may relate to a machine readable non-transitory storage medium having stored therein program instructions that are executable by a processor to: collect, beginning at a baseline position, positioning data and wireless measurement data; determine a new position of the mobile device and a confidence measure associated with the new position of the mobile device; and define a data batch for sending to a server in response to a data batch trigger, where the data batch includes positioning data and AP measurement data collected between the baseline position and the new position, and where the confidence measure associated with the new position of the mobile device meets or exceeds a threshold confidence.

Embodiments disclosed herein may relate to an apparatus for performing measurement batching, the apparatus comprising: means for collecting, beginning at a baseline position, positioning data and wireless measurement data; means for determining a new position of the mobile device and a confidence measure associated with the new position of the mobile device; and means for defining a data batch for sending to a server in response to a data batch trigger, where the data batch includes positioning data and AP measurement data collected between the baseline position and the new position, and where the confidence measure associated with the new position of the mobile device meets or exceeds a threshold confidence.

The above and other aspects, objects, and features of the present disclosure will become apparent from the following description of various embodiments, given in conjunction with the accompanying drawings.

DESCRIPTION

Figure 1:
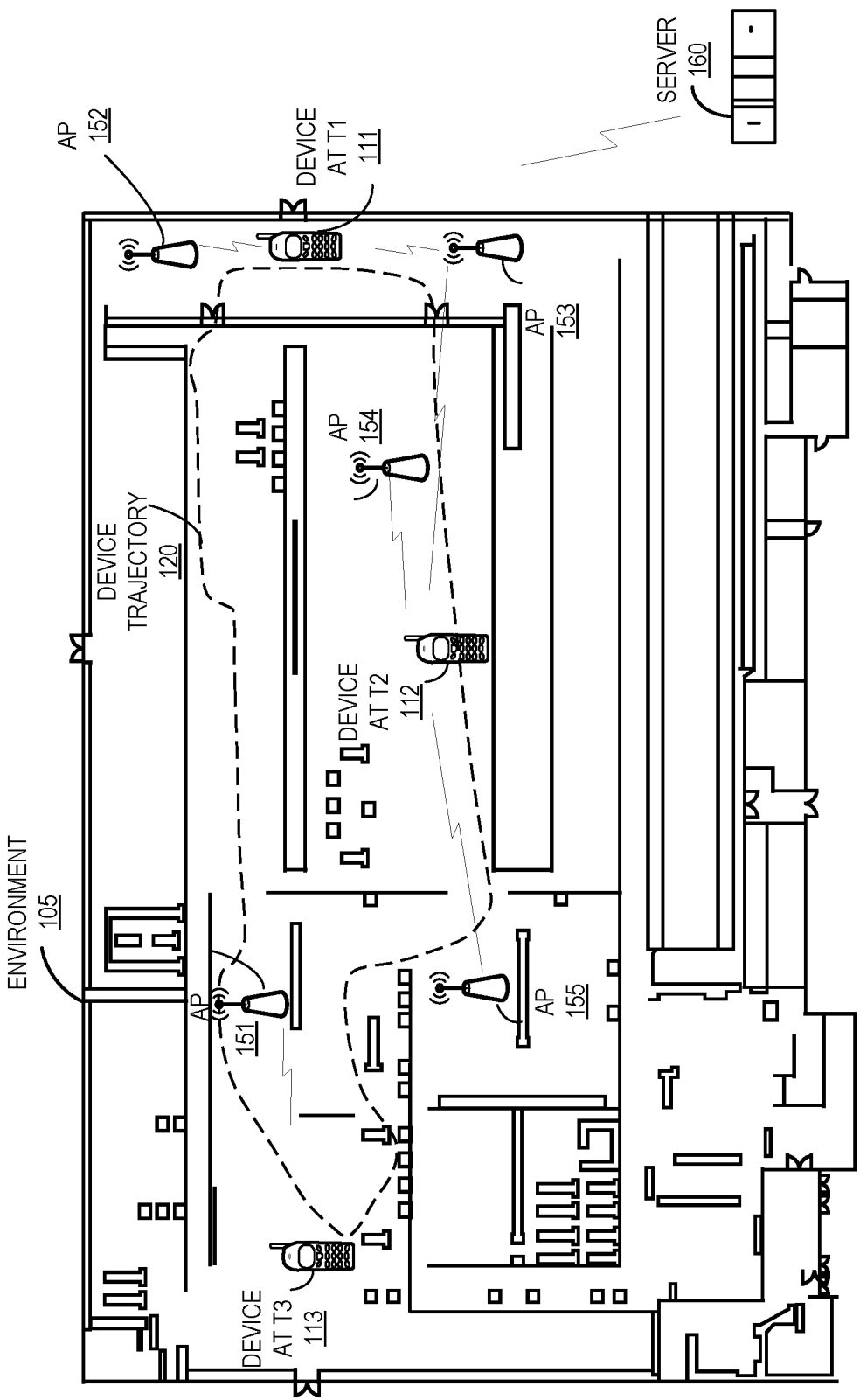
FIG. 1 is a block diagram illustrating an exemplary operating environment in which embodiments for Measurement Batching (MB) may be practiced.

Aspects of the invention are disclosed in the following description and related drawings directed to specific embodiments of the invention. Alternate embodiments may be devised without departing from the scope of the invention. Additionally, well-known elements of the invention may not be described in detail or may be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

Mobile devices may be equipped with satellite based navigation systems for determining position and providing navigation assistance. A global navigation satellite system (GNSS) such as, for example, the Global Positioning System (GPS) may send timing signals used by mobile devices to estimate the position of the mobile device. However, in some situations mobile devices may be unable to receive the satellite timing signals. For example, when a mobile device is indoors, in a canyon, in the shadow of tall buildings, or other environment that may block satellite signals. In such circumstances, sensor equipped mobile devices can perform pedestrian dead reckoning (PDR) to estimate the mobile device's position. However, accuracy is limited by magnetic disturbances inside structures, sensor precision, and other unknown variables such as device position, bias, and differences in stride. Additionally, PDR error from use of mobile device sensor data is typically magnified over time as every new positioning error is compounded with previous errors.

Reliance on PDR when GNSS is unavailable may lead to inaccurate positioning while mobile devices gather AP measurement data for an environment. For example, mobile devices may be utilized in a crowdsourced system to determine information (for example, location) for APs in an environment. AP location errors may be especially pronounced in indoor environments where PDR or GNSS averaging is used to estimate AP locations.

In one embodiment, a device utilizes various timing and processing techniques to create a measurement batch or collection of AP measurement data associated with mobile device positioning data. In one embodiment, a mobile device may use a GNSS position fix to correct potentially less accurate historical mobile sensor based positioning (for example, PDR). A mobile device may traverse an indoor environment and measure AP signals while also tracking current position using the best available positioning methods. In some embodiments, the best available positioning methods may be determined from mobile device motion sensors, such as what may be used as input for determining PDR, which may be used instead of the GNSS due to the building blocking GNSS signals. However, typical PDR can be relatively inaccurate over anything but short distances due to drift and other sensor errors that multiply over time. Therefore, measurement batching will take PDR and AP measurements collected while the mobile is within an indoor environment, and "batch" process the currently collected PDR and AP measurement data together with an updated mobile device position having a higher accuracy. For example, one or more low confidence positions (for example, from PDR) may be adjusted or corrected when a high confidence position (for example from GNSS) is determined. In one embodiment, PDR only positioning data may be adjusted or corrected (for example through a backfilter using a Kalman filter of prior data) according to one or more subsequent more accurate positioning fix(es) (for example, an acquired GNSS fix). Batching may be performed by a server in response to receiving a bundle of positioning and AP measurement data, or batching may be performed directly by the mobile device.

In one embodiment, measurement batching enables radio measurements from one AP to be accurately associated to multiple positions at a finer resolution leading to better AP position estimates than previous techniques. Additionally, some radios like BT may only be seen during a short period where traditional techniques may miscalculate or ignore their measurements. In one embodiment, measurement batching with backward propagation or smoothing enables the computation of position fixes during intermediate broadcast times and allows for position assignments to the BT devices that are observed during these times. In some embodiments, propagation with PDR in the forward direction may be enough for calculating AP positioning, however smoothing of the PDR may be enabled as an additional refinement to obtain more accurate positions. Additionally, measurement batching allows for mobile APs, seen fleetingly during the mobile device's trajectory to be identified and prevented from being erroneously included in a final positioning database. Furthermore, the mobile device may utilize occasional position fixes combined with PDR events instead of relying on constant on high power positioning methods such as GNSS.

FIG. 1 is a block diagram illustrating an exemplary operating environment in which embodiments for Measurement Batching (MB) may be practiced. As illustrated, a device (for example, a mobile device as illustrated in various positions along trajectory 120 at times $T_1$ 111, $T_2$ 112, and $T_3$ 113) may move freely within an environment (for example, indoor environment 105). In some embodiments the environment is a venue, building, or structure, referred to herein as simply the (device) environment or location. As used herein, the term "mobile device" refers to a device that may from time to time have a position that changes. Such changes in position may comprise changes to direction, distance, orientation, etc., as a few examples. The mobile device may have integrated positioning capability above and beyond MB as described herein (for example, motion sensors, GNSS, WiFi positioning, etc.) to determine the position of the mobile device at specified time intervals. In some embodiments, positioning capabilities of the device (for example, GNSS) may become unreliable or inaccessible (for example, when the device is deep indoors and not near a window or opening). In one embodiment, as a device moves about the environment, MB can trigger AP measurements and processing while also determining device positioning.

At some positions within the environment 105, for example deep within a building, a mobile device may be unable to determine accurate position within the environment 105. For example, the mobile device may not have access to GNSS and/or a map of the location. Alternatively, the mobile device may be able to determine accurate positions using measurements of signals from APs inside the environment 105 for which there is reliable AP location data. However, for other APs within the environment 105, AP location data may be unavailable, may be unreliable, or may result in mobile position computations that have a low confidence measure. In one embodiment, as the mobile device traverses the environment, the mobile device computes position fixes or position estimates either using wireless signal measurements (for example, wireless local area network (WLAN) signal measurements) and/or tracks relative movement with mobile device motion sensors (for example, accelerometer, gyroscope, and others) to define a trajectory. While collecting such data for position fixes or estimates, the mobile device may also be collecting AP measurement data, where the AP measurement data may include APs without known locations or with locations that are not reliably known. In one embodiment, in helping to gather crowdsourced data, the mobile device can "batch" positioning and wireless measurement data collected along the trajectory into a single data batch to a server. Using this kind of data, the server can improve AP location information.

In one embodiment, mobile devices store their trajectory (for example, device trajectory 120) as determined from their motion sensors (and/or other indoor positioning methods) within the mobile device. In some embodiments, various positions along a trajectory are associated with AP measurements obtained at that particular position. The positions along the trajectory may be post-processed and/or improved when more accurate positions are determined, such as when GNSS is obtained. For example, as illustrated in FIG. 1, device at time T1 111 may record radio signal measurements from APs 152 and 153, while at time T2 112 the device may record radio signal measurements from APs, 153, 154, and 155. In one embodiment, when a GNSS and/or other position fix may be detected with high confidence, the mobile device may align the prior trajectory to the high confidence position fix and to update previously computed positions via backfiltering the PDR positioning data.

In one embodiment, the mobile device may estimate position and trajectory of a mobile device based on information gathered from various systems (for example, mobile device motion sensors and PDR). One such system may comprise a wireless network compatible with one or more of the Institute of Electrical and Electronics Engineers (IEEE) 802.11 wireless local access network (WLAN) standards, which may also be referred to as a WiFi network. Such a network may include wireless transmitters/receivers (for example, APs 151-155) sometimes referred to as beacons, for example. Accuracy or availability of traditional mobile device positioning systems may depend, at least in part, on wireless access point mapping, wherein information related to wireless access points including estimated positions may be stored in a database or other storage type on a server. A position estimate, which may also be referred to as a position "fix," for a mobile device may be obtained based at least in part on distances or ranges measured from the mobile device to one or more wireless APs, and may also be based at least in part on knowledge of the positions of the one or more wireless APs. In one embodiment, a mobile device may not have access to a wireless AP database and may not have access to absolute AP locations/coordinates. In other embodiments, the location data in a wireless AP database may be inaccurate and crowdsourcing data can be used to improve AP location data. Often, for a given venue, some APs in the wireless AP database may have accurate location data associated with them, and other APs in the wireless AP database may have inaccurate or unreliable location data associated with them.

A mobile device may interface with wireless communication components including, for example, cellular communication systems, wireless local area networks, or other types of wireless communication systems. Wireless communication of the mobile device may employ one or more wireless transmitters/receivers that may be referred to as "base stations" or "access points," for example. As used herein, the terms "base station" and "access point," represent example types of wireless-transmitters, although the scope of claimed subject matter is not limited in this respect. As used herein, the term "AP" is meant to include any transmitter or transmitter/receiver of wireless signals compatible with any type of wireless communication system. For example, an AP may be Bluetooth device transmitting over a protocol defined by the trade organization Bluetooth Special Interest Group (SIG).

The term "AP" is also meant to include any wireless communication station or device utilized to facilitate communication in a wireless communications system, such as, for example, a cellular network, although the scope of claimed subject matter is not limited in this respect. An example type of wireless transmitter utilized in a cellular network may be referred to as a base station. In another aspect, a wireless transmitter may comprise a femtocell, utilized to extend cellular telephone service into a business or home, for example. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet. In another aspect, wireless APs may be included in any of a range of electronic device types. In an aspect, a wireless AP may comprise a WLAN AP, for example. Such a WLAN may comprise a network that is compatible with one or more of the IEEE 802.11x standards, in an aspect, although the scope of claimed subject matter is not limited in this respect. Additionally, the use herein of the term "AP" in describing a device does not limit that device's function to transmitting only. For example, base stations and access points are typically capable of both transmitting and receiving wireless signals.

In one embodiment, a mobile device can read device sensor data to determine context or position. For example, a mobile device can create context data, or data related to the environment of the device by polling or extracting data from one or more of the mobile device sensors described above. As one example, the mobile device may receive positioning information from a GPS or from WiFi (WLAN-based) positioning to determine a location of the device. The mobile device may also read camera images or data from a camera sensor to determine information about the device environment (for example, whether the device is indoors or whether any detectable landmarks are visible). Using the context data, measurement batching at the mobile device or server can determine further information about the environment/location. For example, the mobile device may extract longitude and latitude coordinates from the GPS, and determine the coordinates are associated with a specific building or section of a building.

In one embodiment, based on positioning or location information received from each mobile device, the server can create and send a device operation configuration to crowdsourced mobile devices (for example, as a recommended set of parameters) in the measurement batching system. To create the device operation configuration, the server may first determine what if any data gaps exist within the location database (for example, a location database on server 160). Based on the gaps, the server may determine what kinds of AP measurements ought to be collected and may then define a device operation configuration accordingly.

In one embodiment, a device operation configuration includes one or both of an AP measurement configuration introduced above and a batch configuration as will be discussed in greater detail below. Generally, the batch configuration includes parameters for processing motion sensor positioning and AP measurement collection. For example, a batch configuration may include one or all of parameters for batch size, device power usage (for example, a power budget for collecting data), and processing priority of measurement batching relative to other uses of mobile device resources. The device operation configuration can specify what kinds of AP measurement or mobile positioning data to collect, whether to collect such data at all, and how/if a device will batch data. Mobile devices can receive a device operation configuration from the server or may generate or modify a local device operation configuration.

In one embodiment, server 160 may provide a location database (including location assistance data), and/or device operation configurations. In some embodiments, server 160 provides location or assistance data to help devices determine accurate positioning or localization. For example, within an indoor shopping mall, GPS positioning may be most accurate when the mobile device is positioned near windows or other openings. In this indoor shopping mall example, the server may send the device location data to help the device more accurately determine position within the shopping mall such that the mobile device can activate or deactivate one or more sensors as appropriate for the given location. The location data may include location specific features, landmarks, or identifiers.

The mobile device can refer to the location assistance data to optimize positioning of the mobile device. For example, if the mobile device receives location assistance data that indicates the mobile device location has few windows or other location features that promote efficient access to communication outside of the current building, the mobile device may automatically turn off GPS or other satellite communication features. If the location assistance data indicates the respective location has some windows that may allow for a weak GPS signal, the mobile device may determine a GPS can be polled occasionally (for example, reduced usage model) instead of being activated continuously (for example, constant on model). The location assistance data may include details to allow the mobile device to determine proximity to a window or open area that may potentially offer more accurate GPS signal reception.

In one embodiment, the AP measurement configuration optimizes the data collection such that a mobile device can collect data on an as needed basis. The server may send a recommended AP measurement configuration including specific measurement requests from the mobile device. For example, the server may determine that location assistance data for a location is incomplete or has partial coverage regarding the WiFi access points near the mobile device. Although the mobile device may not necessarily need to collect WiFi data in order to perform user functions (for example, navigation), the mobile device may nonetheless accept the server request to update and maintain the location assistance data on the server (for example, as part of location database). Therefore, the server may request individualized data collection from a group or "crowd" of mobile devices in order to maintain and update the location database on the server.

A server (for example, server 160 implementing measurement batching functionality described herein) may maintain updated location features/attributes based on crowdsourcing data collection from one or more devices (for example, mobile device/devices). For example, as a device navigates an indoor location (for example, environment 105) data collected during navigation may be sent to the server as a batch of data (rather than as a series of real-time or near real-time data updates) to update and maintain location features. In one embodiment, the server can use measurement batching functionality in conjunction with one or more mobile devices to crowdsource AP measurement data. By determining when to collect and batch measurement data, the server or mobile devices can intelligently throttle or adjust the amount or type of subsequent AP measurement updates sent by each respective mobile device. In one embodiment, the server recommends mobile device parameters for: frequency of data collection, which sensors to activate, how often to send measurement batches to the server, a power budget for collecting the batch data, a batch data file size, or what type of data to collect.

In one embodiment, a mobile device can apply a server's recommendations in response to determining whether each particular recommendation is compatible with the device settings or features. For example, user supplied settings may restrict the use of GPS when battery is low or have privacy settings to limit the use of camera sensors even though the measurement batching (for example, as specified in a batch configuration file or other type of request/recommendation sent from the server) may recommend GPS or camera activation.

Location assistance data can include: a map of the location (for example, including building or floor layout and points of interest), number of known access points, historical data traffic, device activity associated with the position or location, or other known location features.

In one embodiment, the location data stored at the server (for example, within the location database) may be determined by a baseline data collection sequence from one or more mobile devices or a pre-seeded database. During one or more initial position data collection sessions by one or more mobile devices, measurement batching at the server may obtain location data as described above. Subsequent mobile device data collection received by the server can be used to maintain and keep the location database up to date. For example, upon detecting a mobile device within a respective location, the server may compare incoming data collection at that location to current location data on the server. If the location data received by the server is more up to date or adds additional location data, the location database at the server may be updated. The updated location data can be used to benefit subsequent mobile device connections when the location data is requested by a mobile device.

In one embodiment, collecting positioning and AP measurement data at a mobile device can begin when a change in the environment (for example, data related to a particular location) is detected. For example, a mobile device may determine three WiFi access points are detected in a location when ten access points are expected based on prior data collection (for example, stored within the location database at the server). Based on a change in the environment for a given location, the server can request more AP measurement crowdsourcing in a given area, location, or building. The server can create an AP measurement configuration to recommend the mobile device to turn on additional sensors or increase the frequency of measurement calculations for subsequent data collections in the given area, location, or building by one or more devices.

In one embodiment, collection of positioning data and AP measurement data can be responsive to one or more factors, where the start of data collection can define the beginning of a data batch for measurement batching described herein. In one embodiment, the mobile device may receive a direct request to begin data collection associated with a particular location. For example a location (for example, venue, shopping mall, or place of business) may change a layout of the building or floors and a server may request measurements for the location to update data associated with their real world physical space. In one example, the location may have remodeled and walls or rooms that influenced the effectiveness of WiFi positioning may be missing or added since the prior position data collection. Also access points may be added or removed which could change known location features storage at the server. Upon changing the layout or features of a location, access points may send out notification directly to the server of an updated connection layout. Alternatively, the location owner or manager may send a request to update position data upon a change in layout of the venue.

The server may request AP measurements responsive to different situations, or the mobile may determine that better AP measurements are recommended for a given location. For example, in response to detecting a change in positioning performance of the mobile device, the mobile device may begin collecting positioning and AP measurement data to send as a data batch to a server. In other embodiments, a server can detect the change in positioning performance and request AP measurements and/or send request to mobile devices indicating that more data is requested for a given location. Positioning performance may relate to the ability of the mobile device to determine or infer a position or location of the mobile device, for example, relative to a landmark, map coordinates, or other physical space. For example, a user may complain about positioning performance in an application (for example, a navigation application) on the device and the poor positioning performance may be reported to the server by the application or user. Upon receiving notification of potential degradation of positioning performance, the server can create and send a specific request for AP measurements for that location or can provide an AP measurement configuration that specifies a preference for crowdsourcing for that location. For example, an AP measurement configuration could include a server's recommendation to turn on additional sensors to aid device positioning and navigation within the respective location (for example, a building or floor of a building). Hence, an AP measurement configuration can include parameters indicating which sensors (including WiFi, BT, or other wireless or other sensors) to turn on or off while collecting AP data. In some embodiments, the server may also recommend particular sensors for mobile positioning (for example, recommending using PDR based positioning over GNSS or other combinations and sensors).

In one embodiment, the server requests AP measurements when a threshold amount of time has lapsed since a previous measurement data batch. In some embodiments, the mobile device or the server waits a threshold amount of lapsed time before beginning data collection for a data batch. For example, the server can determine that AP measurement data for a particular location is outdated (i.e., age of data exceeds a recommended threshold amount of lapsed time), and request one or more devices to provide updated data. In some embodiments, the mobile device is self-aware of the age of the most recent AP measurement and can trigger collections accordingly. The server can send a crowdsourced request for mobile devices to collect updated or additional AP measurement data from one or more devices at respective coverage areas having stale data.

In one embodiment, AP measurement and/or mobile device positioning methods can be configured according to the particular location or venue. For example, a server or mobile device may recommend a first collection procedure for a specific shopping mall compared to a second different collection procedure for a specific office building. Furthermore, different sections of a location may trigger different AP measurement configurations. For example, the lobby of an office building may have different location features and higher foot traffic than an office space on a higher level of the building. Based on the different features of the respective location, the server can adjust one or more of the data collection parameters from the devices at the location.

In some embodiments, the implementation of measurement batching at a particular device is according to the available features of the device (for example, whether the device has Bluetooth, accelerometer, WiFi, or other capability used to determine position or context for the device environment). For example, one device may have Bluetooth and WiFi, while other devices may be lacking Bluetooth but have multiple cameras or a magnetometer. Depending on specific device capability, a customized device operation configuration can be created by the server and sent to the device. For example, a BT and GNSS enabled device may be able to provide detailed BT positioning information to the measurement batching server. In another example, a device has WiFi and is enabled to determine location based on visible light communication, but not GNSS, and hence the server may recommend using visible light communication when available for a high confidence position fix.

In one embodiment, the mobile device or server determine a quality and/or amount of AP measurement data to collect based on quality and/or amount of prior data collected. Depending on the capture time of the most recent position data for a location, the next measurement batch may be more or less data intensive, or occur earlier or later. For example, after 6 months without new or updated position data for a location, measurement batching may resume data collection at a location.

In one embodiment, RSSI and RTT calculations for devices at a particular location may be monitored. Based on changes in measurement of the RSSI and RTT for a location compared to historical levels of RSSI and RTT, the device can be adjust its operation to include additional or fewer sensors to aid in device positioning. In some embodiments, device positioning may be adjusted in response to a server request.

In alternate embodiments, the mobile device or server can adjust the intensity or frequency of data collection for particular mobile device sensors based on a change in historical levels of RSSI and RTT. For example, an access point may fail or be removed from a location, resulting in different RSSI and RTT values from previous data collection sessions. Additional data collection from devices based on the change in recorded RSSI and RTT may be recommended. For example, additional data collection may include additional sensors or increased robustness for existing sensors.

In one embodiment, the mobile device or server can determine frequency of data collection. Data can be collected in any time increment, however the server and mobile device may independently balance the need for data with the goal of minimizing the impact on other devices. Data collection may be adjusted by the server based on one or more of: time of day, day of a week, date, currently available position data collection, or time lapsed since a previous data collection. For example, the server may determine that during peak shopping hours, all of the mobile devices at a shopping mall do not need to collect and report positioning data at the same time. The server may determine that a small subset of all available mobile devices could be used to refresh position data at the server. Additionally or alternatively, the mobile device or server can determine the time for uploading a data batch to the server. The particular transfer time at which the data batch is sent to the server can be a configurable value that may be any time at or after the data batch is collected and defined.

In one embodiment, the mobile device stores updated positioning data and AP measurement data in local memory (for example, a buffer), and sends one or more measurement batches from memory to the server when a WiFi connection is available or when a buffer is full. For example, instead of immediately uploading measurement batches at the location (for example, over a cellular data connection), a device may delay sending measurement batches until the device is connected to a network with WiFi. In some embodiments, data uploads may occur when the device is connected to a power source (for example, charging cable is attached), or at a particular time within a twenty-four hour period (for example, at midnight or very early in the morning).

In one embodiment, devices connected to the measurement batching server can self configure operating parameters independently, or alternatively with input from the server. Devices may use some or none of the recommended parameters from the server when implementing their own device operation configuration. For example, the server may request or recommend a device collect and send BT position data to the server. However, if device detects it has low battery the device may determine that BT monitoring should remain deactivated until the device battery can be recharged. The server can receive a battery level (capacity, or other status) from crowdsourced devices and create recommendations according to the reported status of each device.

Figure 2:
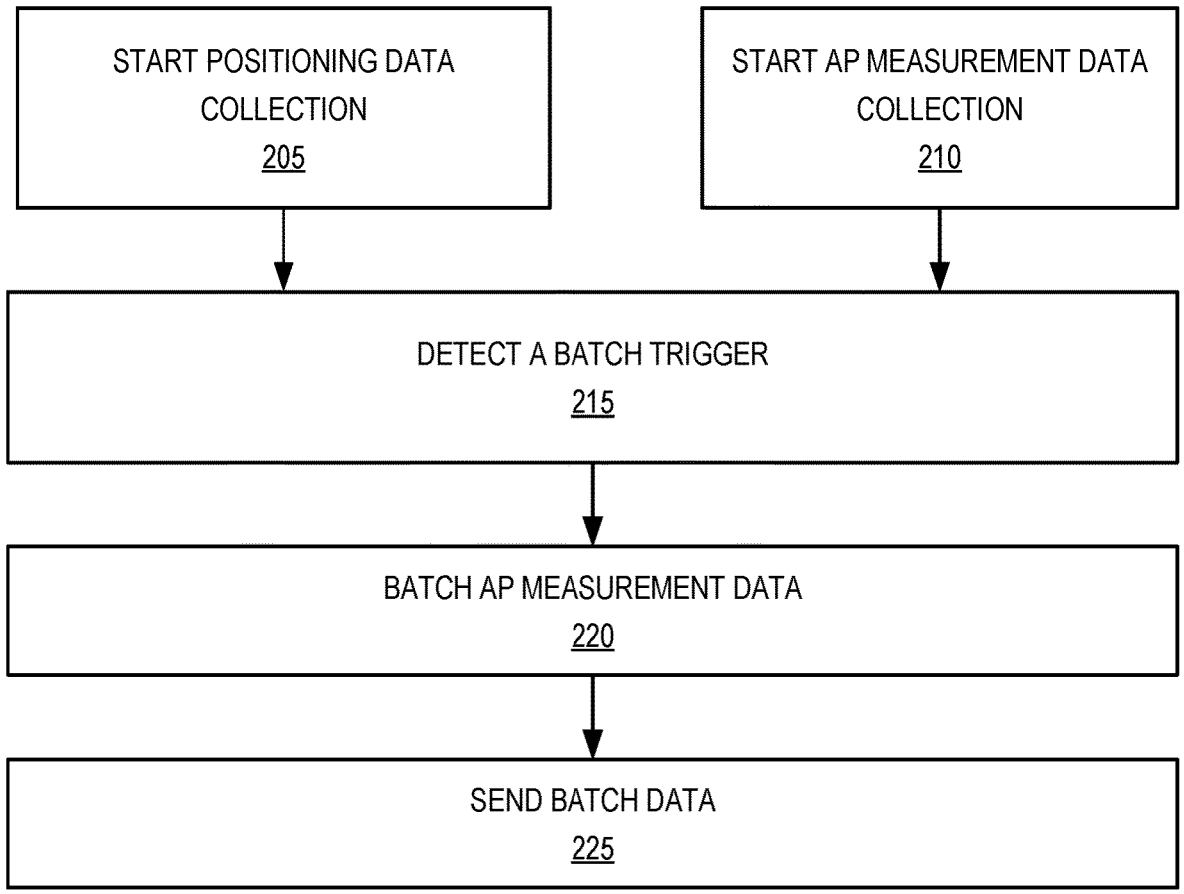
FIG. 2 illustrates a method for MB implemented at a mobile device, in one embodiment.

FIG. 2 illustrates a method for MB implemented at a mobile device, in one embodiment. For example, the mobile device may optimize crowdsourcing using AP measurement data batching, post-processed position estimation, and smoothing.

At block 205, the mobile device starts positioning data collection. For example, the mobile device may retrieve GNSS if available. If GNSS signal is unavailable, the mobile device may initiate PDR from mobile device motion sensors. In one embodiment position, velocity, and their respective uncertainties are available as positioning data recorded at discrete times. Positioning data can include a precise system such as GNSS positioning data, wireless positioning data (including WLAN, Bluetooth, or other positioning technology), and visible light communication positioning data as just a few examples. In some embodiments, positioning data may include approximated or estimated locations, such as PDR based steps, relative turn angles (RTA), and/or course over ground (COG), and their respective uncertainties. PDR, RTA, and COG may be available at higher rates than other more process or energy intensive positioning methods (for example, GNSS).

At block 210, the mobile device starts AP measurement data collection. At one or more points along the mobile device trajectory, AP measurement data may be collected and associated with the current position of the mobile device. In one embodiment, the mobile device continuously scans for WiFi, BT, or other radio APs and timestamps the received RSSI/RTT measurements. AP measurement data may be time tagged and stored locally at the mobile device.

At block 215, the mobile device detects a batch trigger. In some embodiments, the batch trigger factors include detecting a high confidence position fix. For example, PDR may be considered to yield a low confidence position compared to GNSS which may yield a high confidence position. Hence a batch may be defined based on a batch end point triggered by a confidence associated with a new position that is higher than a confidence in one or more intermediate positions between a baseline position and the new position. Trigger factors may also include determining a context of the mobile device, where the context comprises one or more of: location of mobile device, amount of data previously collected by the mobile device or within a particular location, rate of travel of the mobile device, or any combination thereof. Trigger factors may also include receiving a trigger from a server. For example a server may determine the mobile device is in a location, or context (for example, time of day), that needs AP measurement data. Trigger factors may include determining a transition event of the mobile device, such as determining the mobile device has exited a building, a car, or an environment. Trigger factors may also include determining that mobile device positioning data reliability will fall or has fallen below an acceptable limit. For example, deep within a building, GNSS may be unavailable. Based on the last reliable fix, the mobile device may continue collecting positioning data using mobile device motion sensors while also collecting AP measurement data. When using mobile device motion sensors to compute position, the reliability of the collected positioning data generally tends to degrade with time and/or distance from the last reliable fix. Hence, once it is determined that the reliability of the positioning data is about to fall below an acceptable limit, data collection may end, a batch may be defined, and a batch endpoint may be triggered. In another example, mobile device positioning data reliability falling below an acceptable limit can include situations where sensor-based positioning has been yielding good positioning data, however, a user motion has degraded the reliability (such as swinging an arm, etc.), and a batch can be triggered based on the sudden degradation in the reliability of the positioning data.

Trigger factors may be recorded in a batch configuration stored as a file or set of parameters referenced by the mobile device. The batch configuration can be stored on the mobile device and/or updated and received from the server. The batch configuration can include, for example, a batch size, a power budget, or a priority level for crowdsourcing relative to other uses of mobile device resources. Hence, once positioning data and AP measurement data reaches a certain size, uses a certain amount of power, or mobile resources are needed for higher priority uses than crowdsourcing, data collection may end and a batch may be defined and a batch endpoint may be triggered. The batch configuration may specify one or more settings or parameters related to the above mentioned factors (for example, how each factor should be weighted and when to ignore or follow one or more factors). In some embodiments, the batch configuration is a subset or part of the device operation configuration as introduced above.

At block 220, the mobile device batches the data. In one embodiment, in response to detecting the batch trigger, the mobile device post-processes position measurements and measurement data (for example, PDR events). In one embodiment, post-processing position measurements and measurement data may be implemented with forward-backward smoothing extended Kalman filtering (EKF) such that positions and uncertainties can be estimated at the AP measurement times (or best effort). For example, AP measurement batching with positions-of-opportunity and positioning filters may be executed to perform forward and backward for smoothing of positions at various AP measurement data points along the mobile device trajectory.

For each AP, this measurement batch approach can produce multiple user positions (and associated confidence measures) along the track that can be used as references to estimate AP position. In one embodiment, AP position may be solved by iterative least squares. If the same AP is seen during different user tracks within an environment, the mobile device can identify a track during which signals from the AP are stronger and associate positions from that track.

At block 225, the mobile device sends the measurement batch (for example, to a server or other device for processing). In some embodiments, AP positions are estimated and refined at the mobile device before sending to the server. In some embodiments, a set of mobile devices may work in parallel to provide their measurement batches to the server (for example, in a crowdsourced/group processing and distribution). Each measurement batch may be associated with the respective mobile device that recorded and processed its measurement batch.

Figure 3:
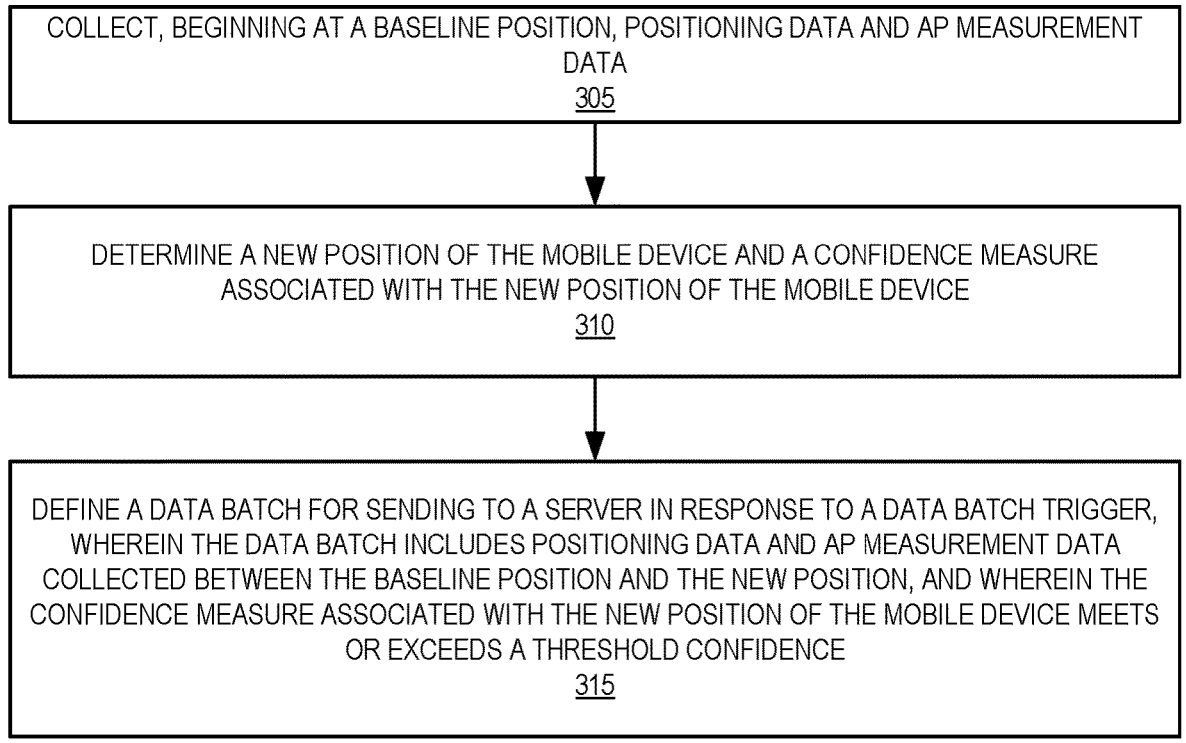
FIG. 3 illustrates a method for mobile device implemented MB, in another embodiment.

FIG. 3 illustrates a method for mobile device implemented MB, in another embodiment. At block 305, the mobile device collects, beginning at a baseline position, positioning data and measurement data, for example wireless measurement data. The measurement data is described throughout this description as AP measurement data (for example, WiFi/WLAN) for simplicity, however it is understood that the measurement data can include measurement data associated with signals from transmitters of any of a number of wireless systems for which there is interest in correlating positioning data, such as position fixes, with signals from such systems, including WiFi, Bluetooth, cellular, visible light communication systems, WiMax (802.16), Ultra Wide Band, ZigBee, wireless USB, or other wireless system. For example, the baseline position may be a position determined from GNSS or another reliable method. Alternatively, the baseline position may not be determined with a high degree of certainty and instead may be an estimated starting point (using any of a number of positioning technologies) for PDR. In some embodiments, in response to establishing a baseline position, the mobile device continues to track position through the use of one or more mobile device motion sensors (for example, accelerometer, gyroscope, magnetometer or other sensors as described herein), WLAN, and GNSS (when available). In some embodiments the AP measurement data comprises one or more of: RSSI, RTT, machine access control (MAC) address, or any combination thereof. In some embodiments, collection of the AP measurement data is in response to one or more of: a determination of a context of the mobile device (for example, the context may comprise one or more of: location of mobile device, amount of data previously collected by the mobile device or within a particular location), rate of travel of the mobile device, or any combination thereof. In some embodiments, collection of the AP measurement data is in response to one or more of: receipt of a server request for AP measurement, an AP measurement configuration (for example, the collection of AP measurement data is responsive to a particular parameter, rule, or criteria provided for in the respective AP measurement configuration), a transition event of the mobile device, or any combination thereof. In some embodiments, collection of the AP measurement data is in response to a determination that mobile device positioning data reliability meets one or more criteria. For example, when previous positioning data reliability is low, and hence no crowdsourcing was being performed, subsequently reliability may improve such that the mobile device may begin collecting data. The reliability improvement may therefore serve as a criterion (alone or among a plurality of criteria) for defining a starting point for a measurement data batch.

At block 310, the mobile device determines a new position of the mobile device and a confidence measure associated with the new position of the mobile device. For example, the new position may be determined using a positioning technique that generates a new position with a high confidence measure after one or more intermediate positions are estimated using a positioning technique that generates positions having a relatively lower confidence measure, including PDR (for example, mobile device sensors), WLAN-based positioning data using APs having locations that are not reliably known, or visible light communication positioning data using light fixtures with locations that are not reliably known. In some embodiments one or both of the baseline position and the new position are determined with high confidence from GNSS positioning data, wireless positioning data using APs having reliably known locations, or visible light communication positioning data using light fixtures with reliably known locations.

At block 315, the mobile device defines a data batch for sending to a server in response to a data batch trigger. The data batch may include positioning data and AP measurement data collected between the baseline position and the new position. In some embodiments, the confidence measure associated with the new position of the mobile device meets or exceeds a threshold confidence. When the confidence measure associated with the new position of the mobile device meets or exceeds a threshold confidence, such data can be useful in crowdsourcing AP location information and hence the measurement data batch is useful and can be sent to the server immediately or at a later time relative to detection of the data batch trigger. In some embodiments, the batch trigger can include a plurality of factors which can trigger the end of a batch of data for sending to the server. Any combination of these factors can result in a batch trigger for defining a data batch. The data batch trigger can include, for example, one or more of: a determination of a context of the mobile device, where the context comprises one or more of: location of mobile device, amount of data previously collected by the mobile device or within a particular location, rate of travel of the mobile device, or any combination thereof. Trigger factors may also include: receipt of a request from a server to end a data batch, compliance with an AP measurement configuration or batch configuration, a transition event of the mobile device, a determination that mobile device positioning data reliability will fall or has fallen below an acceptable limit, a determination that the confidence measure associated with the new position is higher than the confidence measure in one or more intermediate positions between the baseline position and the new position, or any combination thereof. While discussed above in the context of determining when to end a data batch, it is also understood that the data batch trigger factors above may also be used to determine when to begin collecting data at the baseline position. It is understood that the factor that triggers the beginning of a measurement data batch can differ from the factor that triggers the end of the measurement data batch in general, or for a particular data batch.

In some embodiments, factors that may define a batch may be the same or different than factors that trigger sending the batch to a server or other device. For example, once a batch is created or generated, the batch may be sent immediately or in some implementations the batch may be held in a local queue for sending or processing at a later time (for example, in response to a request or meeting some trigger criteria).

In one embodiment, the mobile device may collect positioning data via PDR and associate such positions with AP measurement data until a next GNSS position fix may be determined. Once a GNSS or other position with high confidence is determined (such as WLAN-based position using APs with reliably known positions, or using visible light communication positioning data using light fixtures with reliably known locations), the estimated positions from PDR may be adjusted for accuracy accordingly. In some embodiments, processing the data batch before sending includes backfiltering of positioning data lying along the trajectory from the baseline position to the new position.

Figure 4:
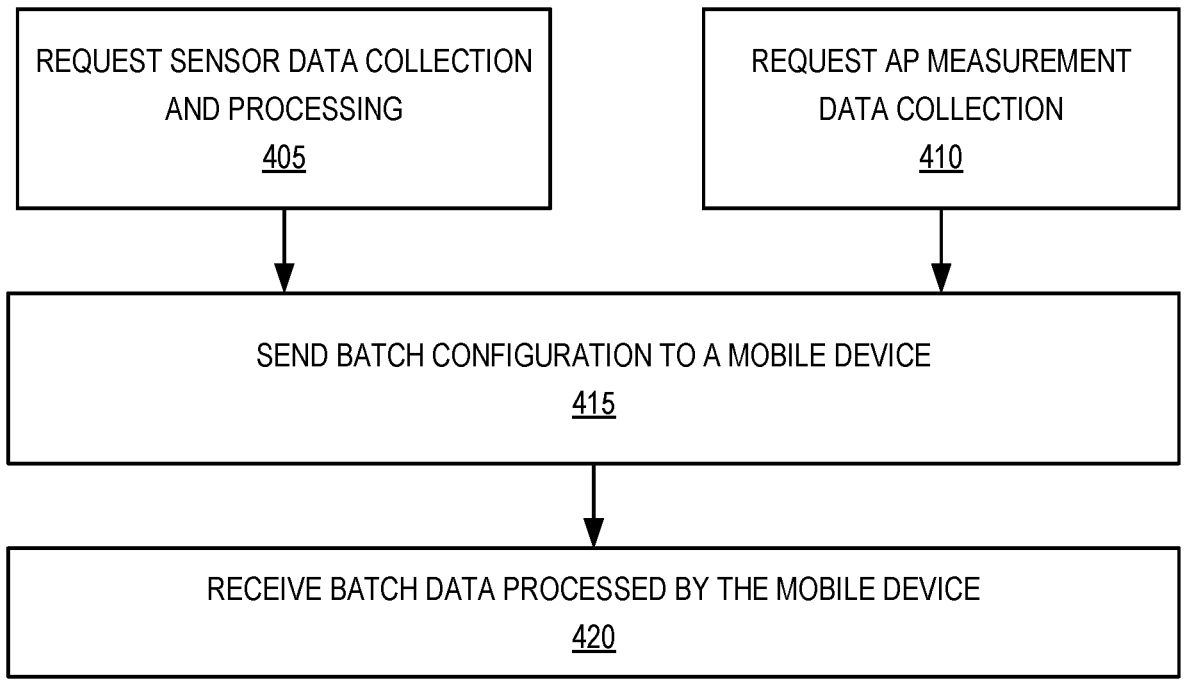
FIG. 4 illustrates a method for MB implemented by a server, in one embodiment.

FIG. 4 illustrates a method for MB implemented by a server, in one embodiment. At block 405, the server (e.g., MB server) requests positioning data collection and processing, where positioning data can include GNSS observations, sensor data, and other data (WLAN-based or visible light-based data) for calculating a position fix.

At block 410, the server requests AP measurement data collection. In response to the server request, one or more mobile devices may trigger AP measurement data collection such that the one or more mobile devices begin collecting AP measurement data.

At block 415, the server sends batch configuration to a mobile device. The batch configuration can include, for example, data that allows a mobile device to know when to begin and/or end data collection (both AP measurement data and mobile device positioning data). In one embodiment, a server may provide data collection guidance for a mobile device to follow while collecting data with regards to measurement batching. The guidance provided may be integrated in each mobile device in a crowdsourced network of mobile devices. The guidance may include instructions as to when to initiate PDR, WiFi scanning, BT scanning, or any combination thereof, as well as when to determine position fixes from GNSS, visible light communication positioning data, WiFi measurements, or any combination thereof, or other similar methods for accurate position determination. In some embodiments, how the mobile device stores WiFi/BT measurements, timestamps, PDR step events, turn angles, GNSS, visible light communication positioning data, confidence measures, and any associated timestamps are all configurable parameters (for example, as may be stored and specified in the device operation configuration).

At block 420, the server receives batch data processed by the mobile device. In some embodiments, the mobile device sends information to identify the measurements originated from batched data provided by a particular mobile device. The identification of the mobile device may be a device ID or any unique identifier that indicates that the data can be batch processed. For example, when receiving multiple batches, the server can use identification tags to group batches by device. In some embodiments, a server can assign higher weights to some comprehensive data over other types of data, for example, data from a single device can be weighted higher than data from multiple devices in view of consistency in measurements and confidence measures for data from a single device. For example, server can de-weight other data that it has received about a specific AP in the form of geotagged or non-geotagged reports, for example, if data associated with the specific AP came from a mobile device with a relatively small batch (entered a building briefly, and then left), which may be viewed as less reliable than a data batch that included a larger batch with more positioning and/or AP measurement data from a larger number of APs.

Figure 5:
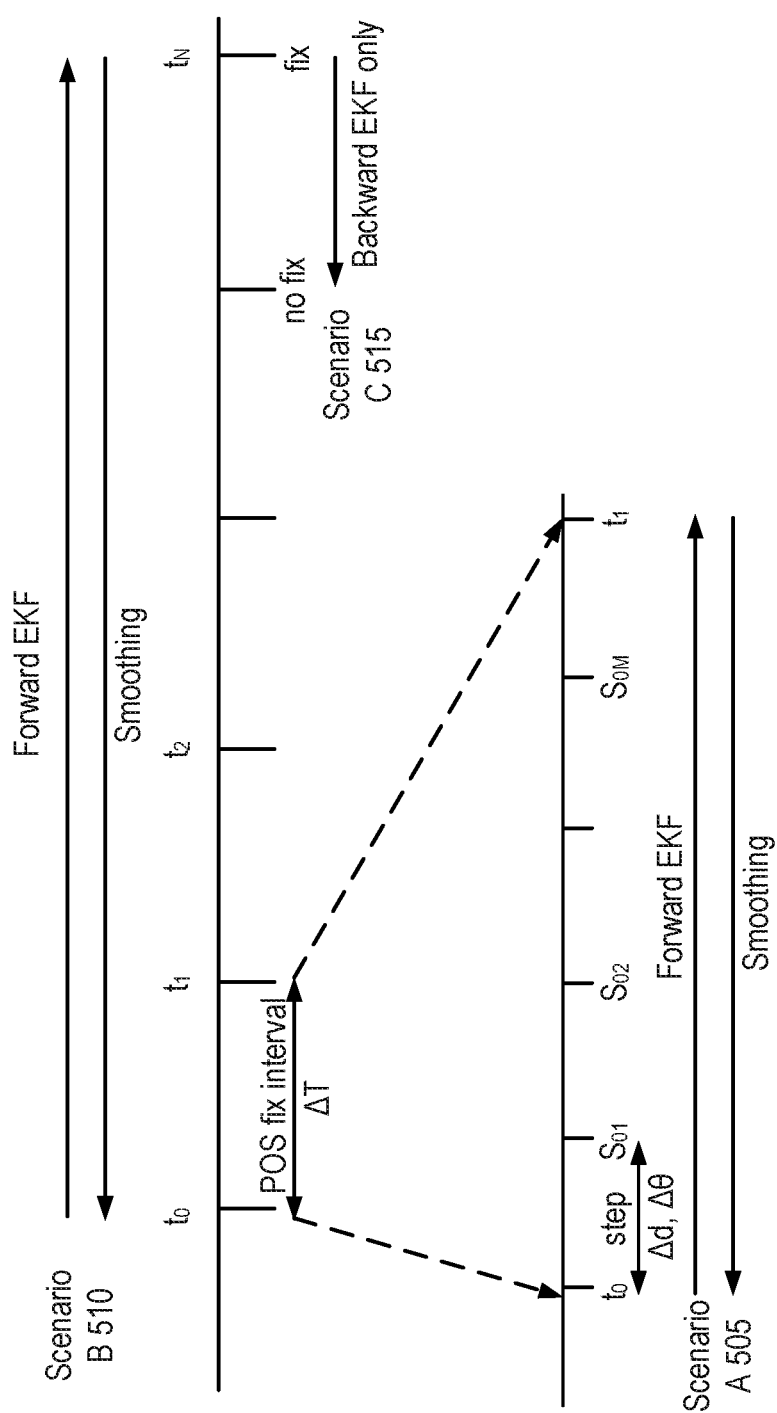
FIG. 5 illustrates three exemplary MB scenarios, in one embodiment.

FIG. 5 illustrates three exemplary MB scenarios, in one embodiment.

Scenario A 505 illustrates a limited batching and report interval. Batches of positions (and radio or other measurements) are reported back to the server every $\Delta T$ seconds (from time T to T+$\Delta T$, for example from time $t_0$ to time $t_1$, with intermediate fixes every $\Delta t$ seconds, at step times ($S_{01}$, $S_{02}$, ..., $S_{0M}$), or at some other determined marker). In one embodiment, the mobile device calculates forward EKF from T to T+$\Delta T$, for example from time $t_0$ to time $t_1$, with intermediate fixes every $\Delta t$ seconds (where there are a plurality of $\Delta t$ increments between $t_0$ and $t_1$, for example), at step times, or at some other determined marker. The mobile device may also execute a trajectory smoother from T+$\Delta T$ backward to T with intermediate fixes every $\Delta t$ seconds, at step times, or at some other determined marker.

Scenario B 510 illustrates a heavily processed data batch over a report interval. In one embodiment, a batch of data (including intermediate position fixes and AP measurement data) from the beginning to the end of an activity (for example, from time $t_0$ to $t_N$ with intermediate fixes every $\Delta t$ seconds, at step times, or at some other determined marker) is reported back to the server (which may happen at the end of the activity, or may be reported to the server at a later, for example, regular, pre-scheduled time). In one embodiment, the mobile device calculates forward EKF from $t_0$ to $t_N$ with intermediate fixes, for example, every $\Delta t$ seconds, at step times, or at some other determined marker. In an embodiment with a heavily processed data batch, additionally, mobile device performs backfiltering, for example a smoothing Kalman filter, from the position fix computed at time $t_N$ back to position estimate computed at time $t_0$ with intermediate fixes every $\Delta t$ seconds, at step times, or at some other determined marker to improve the intermediate fixes in a post processing step. Using such post-processed and improved intermediate position fixes can improve AP location estimation based on the AP measurement data collected simultaneously with the positioning data used to compute the intermediate position fixes that are subsequently improved by post-processing.

Scenario C 515 illustrates a scenario similar to scenario B, but with backward filtering, for example a smoothing Kalman filter, only (without forward EKF). In one embodiment, a batch of data (including intermediate position fixes and AP measurement data) from the beginning the end of an activity (from time $t_0$ to $t_N$ with intermediate fixes every $\Delta t$ seconds or at step times) is reported back to the server. As illustrated in scenario 515, the mobile device may not have determined an initial positioning fix with high accuracy, and positioning data (for example, PDR measurements) and AP measurements along the trajectory are recorded and batched when a high confidence position fix is available at time $t_N$. When a high confidence fix is detected, a smoothing Kalman filter is applied to improve past intermediate position fixes along the recorded trajectory based on the high confidence position fix at the end of the batch. In scenarios B and C, the end of the data batch can be defined based on a batch trigger. Furthermore, while described above in an embodiment where backfiltering is performed by the mobile device, it is understood that a data batch may be sent as raw data (or data with only forward EKF performed), and backfiltering may be performed at the server on the raw data.

Figure 6:
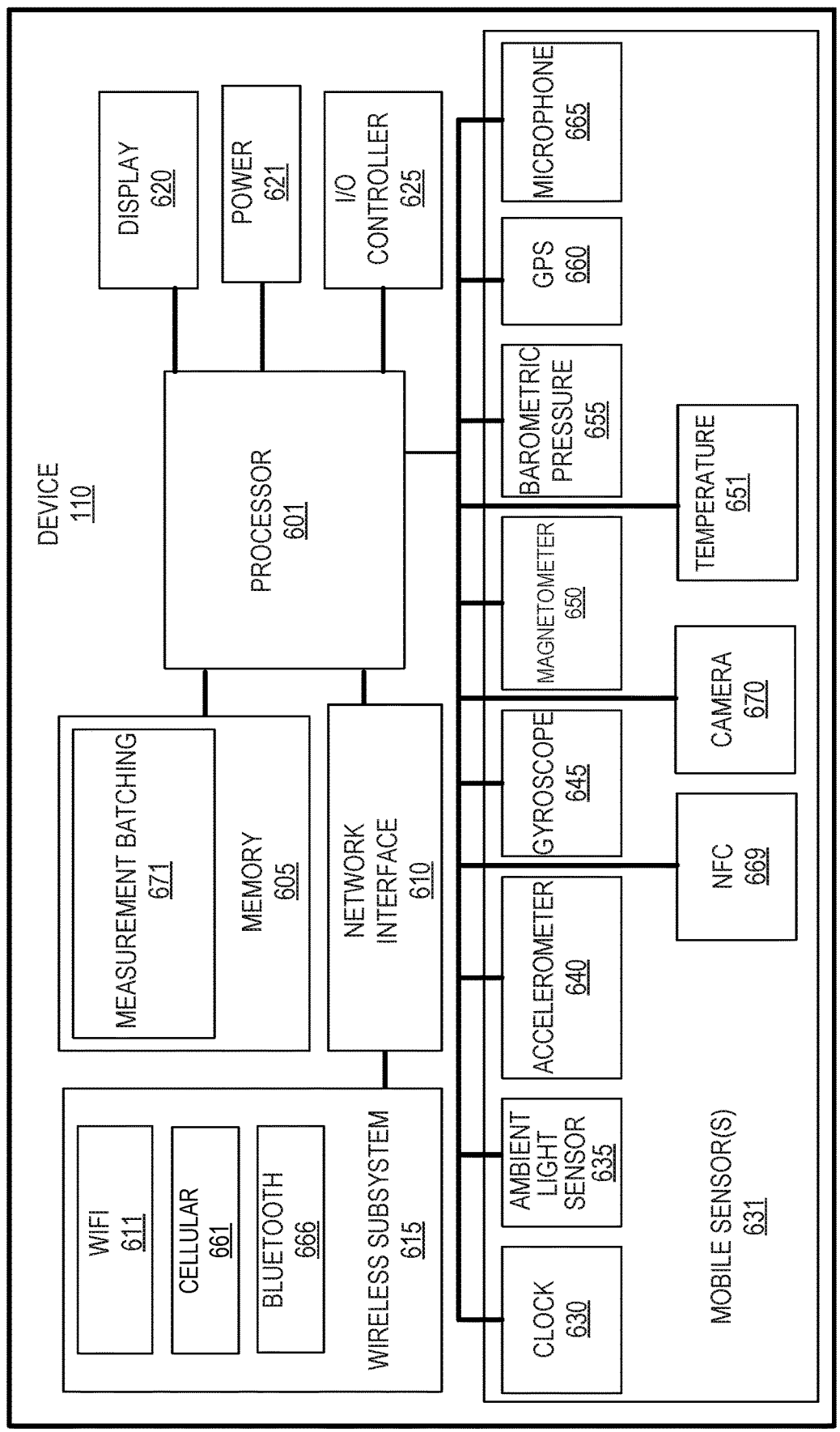
FIG. 6 is block diagram illustrating an exemplary device in which embodiments MB may be practiced.

FIG. 6 is block diagram illustrating an exemplary device in which embodiments of positioning-related data measurement batching may be practiced. Measurement batching described herein may be implemented as software, firmware, hardware, module, or engine. In one embodiment, the measurement batching described herein may be implemented by one or more general purpose processors (for example, processor 601) in device 600 in memory 605 to achieve the previously desired functions (for example, the method of FIGS. 2, 3, and 4).

In one embodiment, device 600 provides, at least in part, means for collecting, beginning at a baseline position, positioning data and wireless measurement data, such means including, for example, sensors discussed below, including motion, pressure, proximity, and ambient light sensors as well as sensors used in positioning including GNSS, WiFi, or other radio frequency or wireless positioning technologies. Device 600 may also provide, at least in part, means for determining a new position of the mobile device and a confidence measure associated with the new position of the mobile device, such means including, as one example, one or more general purpose processors executing software and/or firmware, or hardware, to perform the function of determining the new position of the mobile device and the confidence measure associated with the new position of the mobile device. Device 600 may also provide, at least in part, means for defining a data batch for sending to a server in response to a data batch trigger, where the data batch includes positioning data and AP measurement data collected between the baseline position and the new position, and where the confidence measure associated with the new position of the mobile device meets or exceeds a threshold confidence, such means including, as one example, one or more general purpose processors executing software and/or firmware, or hardware, to perform the function of defining the data batch.

In one embodiment device 600 provides the means for collecting the positioning data and the wireless measurement data in response to determining: context of the device, a receipt of a server request for AP measurement, an AP measurement configuration of the device, a transition event of the device, mobile device positioning data reliability meets a criteria, or any combination thereof. In one embodiment, device 600 provides means for determining a context of the device, where the context comprises one or more of: location of device, amount of data previously collected by the device or within a particular location, rate of travel of the device, or any combination thereof. In some embodiments, means for determining: context of the device, a receipt of a server request for AP measurement, an AP measurement configuration of the device, a transition event of the device, device positioning data reliability meets a criteria, or any combination thereof may be implemented by device 600 (for example, through the utilization of memory 605, I/O controller 625, network interface 610, device sensors 631, or other components described in greater detail below).

Device 600 may be a mobile device (for example, the mobile devices illustrated in FIG. 1), or a server, and may include one or more processors 601, a memory 605, I/O controller 625, and network interface 610. Device 600 may also include a number of device sensors coupled to one or more buses or signal lines further coupled to the processor 601. It should be appreciated that device 600 may also include a display 620, a user interface (e.g., keyboard, touch-screen, or similar devices), a power device 621 (for example, a battery), as well as other components typically associated with electronic devices. In some embodiments, device 600 may be server that does not contain one or more example sensors (for example, motion sensors).

Device 600 can include sensors such as a clock 630, ambient light sensor (ALS) 635, accelerometer 640, gyroscope 645, magnetometer 650, temperature sensor 651, barometric pressure sensor 655, compass, proximity sensor, near field communication (NFC) 669, and/or Global Positioning Sensor (GPS or GNSS) 660. As used herein the microphone 665, camera 670, and/or the wireless subsystem 615 (Bluetooth 666, WiFi 611, cellular 661) are also considered sensors that may be used to analyze the environment (for example, position) of the device.

Memory 605 may be coupled to processor 601 to store instructions for execution by processor 601. In some embodiments, memory 605 is non-transitory. Memory 605 may also store one or more engines or modules to implement embodiments described herein. Memory 605 may also store data from integrated or external sensors. In addition, memory 605 may store application program interfaces (APIs) for accessing aspects of MB as described herein. In some embodiments, MB functionality is implemented in memory 605. In other embodiments, MB functionality is implemented as a module separate from other elements in the device 600. The MB module may be wholly or partially implemented by other elements illustrated in FIG. 6, for example in the processor 601 and/or memory 605, or in one or more other elements of device 600.

Network interface 610 may also be coupled to a number of wireless subsystems 615 (e.g., Bluetooth 666, WiFi 611, Cellular 661, or other networks) to transmit and receive data streams through a wireless link to/from a wireless network, or may be a wired interface for direct connection to networks (e.g., the Internet, Ethernet, or other wireless systems). Device 600 may include one or more local area network transceivers connected to one or more antennas. The local area network transceiver may include suitable devices, hardware, and/or software for communicating with and/or detecting signals to/from WAPs, and/or directly with other wireless devices within a network. In one aspect, the local area network transceiver may include a WiFi (802.11x) communication system suitable for communicating with one or more APs (for example, APs).

Mobile device 600 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, Advanced LTE, WCDMA, UMTS, 4G, or GSM. Additionally, any other type of wireless networking technologies may be used, for example, WiMax (802.16), Ultra Wide Band, ZigBee, wireless USB, etc. In conventional digital cellular networks, position capability can be provided by various time and/or phase measurement techniques. For example, in CDMA networks, one position determination approach used is Advanced Forward Link Trilateration (AFLT). Using AFLT, a server may compute its position from phase measurements of pilot signals transmitted from a plurality of base stations.

Thus, device 600 may be a: wireless device, cell phone, personal digital assistant, mobile computer, wearable device (e.g., head mounted display, watch, glasses, etc.), robot navigation system, tablet, personal computer, server, laptop computer, or any type of device that has processing capabilities. As used herein, a mobile device may be any portable, or movable device or machine that is configurable to acquire wireless signals transmitted from one or more wireless communication devices or networks. Thus, by way of example but not limitation, device 600 may include a radio device, a cellular telephone device, a computing device, a personal communication system device, or other like movable wireless communication equipped device, appliance, or machine. The term "mobile device" is also intended to include devices which communicate with a personal navigation device, such as by short-range wireless, infrared, wire line connection, or other connection—regardless of whether satellite signal reception, assistance data reception, and/or position-related processing occurs at mobile device 600. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

A mobile device may communicate wirelessly with a plurality of APs using radio frequency (RF) signals (e.g., 2.4 GHz, 3.6 GHz, and 4.9/5.0 GHz bands) and standardized protocols for the modulation of the RF signals and the exchanging of information packets (for example, IEEE 802.11x). By extracting different types of information from the exchanged signals, and utilizing the layout of the network (i.e., the network geometry) the mobile device may determine position within a predefined reference coordinate system. For APs with reliably known positions, such determined positions can have a high confidence measure. However, for APs with unknown position, or with positions that are known with low confidence, such determined positions can be unreliable. Hence, AP positions can be crowdsourced using techniques described herein for determining measurement batches and sending such batches to a server for crowdsourcing and analysis.

It should be appreciated that embodiments described herein may be implemented through the execution of instructions, for example as stored in the memory 605 or other element, by processor 601 of device and/or other circuitry of device and/or other devices. Particularly, circuitry of device, including but not limited to processor 601, may operate under the control of a program, routine, or the execution of instructions to execute methods or processes in accordance embodiments described herein. For example, such a program may be implemented in firmware or software (e.g. stored in memory 605 and/or other locations) and may be implemented by processors, such as processor 601, and/or other circuitry of device. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by device 600 itself and/or some or all of the functions, engines or modules described herein may be performed by another system connected through I/O controller 625 or network interface 610 (wirelessly or wired) to device. Thus, some and/or all of the functions may be performed by another system and the results or intermediate calculations may be transferred back to device. In some embodiments, such other device may comprise a server configured to process information in real time or near real time. Further, one or more of the elements illustrated in FIG. 6 may be omitted from the device 600. For example, one or more of the sensors 631 may be omitted in some embodiments.

The teachings herein may be incorporated into (for example, implemented within or performed by) a variety of apparatuses (for example, devices). For example, one or more aspects taught herein may be incorporated into a phone (for example, a cellular phone), a personal data assistant, a tablet, a mobile computer, a laptop computer, a tablet, an entertainment device (for example, a music or video device), a headset (for example, headphones, an earpiece, etc.), a medical device (for example, a biometric sensor, a heart rate monitor, a pedometer, etc.), a user I/O device, or any other suitable device. These devices may have different power and data requirements and may result in different power profiles generated for each interest point or set of interest points.

In some aspects a wireless device may comprise an access device (for example, a Wi-Fi access point) for a communication system. Such an access device may provide, for example, connectivity to another network through transceiver 140 (for example, a wide area network such as the Internet or a cellular network) via a wired or wireless communication link. Accordingly, the access device may enable another device (for example, a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such hardware configuration.

The steps of a method or algorithm described in connection with the embodiments disclosed herein may be embodied directly in hardware, in a software module executed by a processor, or in a combination of the two. A software module may reside in random-access memory (RAM), flash memory, read-only memory (ROM), erasable programmable read-only memory (EPROM), electrically erasable programmable read-only memory (EEPROM), registers, hard disk, a removable disk, a CD-ROM (compact disc-read only memory), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in hardware (for example, hardware 162), software (for example, software 165), firmware (for example, firmware 163), or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for measurement batching at a mobile device, the method comprising:
    receiving, from a server, a batch configuration including instructions as to when to initiate a first positioning method and when to determine position fixes using a global navigation satellite system (GNSS) positioning method;
    collecting, using the first positioning method and beginning at a baseline position of the mobile device, positioning data and wireless access point (AP) measurement data;
    using the GNSS positioning method, determining a new position of the mobile device and a confidence measure associated with the new position of the mobile device, wherein the confidence measure indicates a relative accuracy of the new position of the mobile device;
    in response to determining the new position of the mobile device, processing a data batch for sending to the server, wherein the data batch includes one or more estimated intermediate positions of the mobile device, based on data from positioning data and wireless AP measurement data collected, using the first positioning method, between the baseline position and the new position; and
    sending the processed data batch to the server,
    wherein processing the data batch includes, for each of the one or more estimated intermediate positions of the mobile device, adjusting the estimated intermediate position based on the new position before sending the data batch to the server, and
    wherein the determining a new position comprises detecting that the confidence measure associated with the new position of the mobile device meets or exceeds a threshold confidence, and
    wherein the confidence measure associated with the new position is higher than a confidence in each of the one or more estimated intermediate positions between the baseline position and the new position.

2. The method of claim 1, wherein the one or more estimated intermediate positions are estimated from mobile device motion sensors.

3. The method of claim 1, wherein the collecting positioning data and wireless AP measurement data is in response to one or more of:
    determining a context of the mobile device, wherein the context comprises one or more of: location of mobile device, amount of data previously collected by the mobile device or within a particular location, rate of travel of the mobile device, or any combination thereof,
    receiving a server request for AP measurement,
    following a device operation configuration,
    determining a transition event of the mobile device,
    determining that mobile device positioning data reliability meets one or more criteria, or
    any combination thereof.

4. The method of claim 1, wherein the processing the data batch is also in response to one or more of:
- determining a context of the mobile device, wherein the context comprises one or more of: location of mobile device, amount of data previously collected by the mobile device or within a particular location, rate of travel of the mobile device, or any combination thereof,
- receiving a request from a server to end a data batch,
- following a batch configuration,
- determining a transition event of the mobile device,
- determining that mobile device positioning data reliability will fall or has fallen below an acceptable limit,
- determining that the confidence measure associated with the new position is higher than a confidence measure in one or more intermediate positions between the baseline position and the new position, or
- any combination thereof.

5. The method of claim 1, wherein the adjusting includes backfiltering of positioning data from the new position back to the baseline position.

6. The method of claim 1, wherein the wireless AP measurement data comprises one or more of: RSSI, RTT, MAC address, or any combination thereof.

7. A mobile device to batch measurement data comprising:
- memory; and
- a processor coupled to the memory, the processor and memory configured to:
  - receive, from a server, a batch configuration including instructions as to when to initiate a first positioning method and when to determine position fixes using a global navigation satellite system (GNSS) positioning method;
  - collect, using the first positioning method and beginning at a baseline position of the mobile device, positioning data and wireless access point (AP) measurement data;
  - determine, using the GNSS positioning method, a new position of the mobile device and a confidence measure associated with the new position of the mobile device, wherein the confidence measure indicates a relative accuracy of the new position of the mobile device;
  - in response to a determination of the new position of the mobile device, process a data batch for sending to the server, wherein the data batch includes one or more estimated intermediate positions of the mobile device, based on data from positioning data and wireless AP measurement data collected, using the first positioning method, between the baseline position and the new position; and
  - send the processed data batch to the server,
- wherein the processor and memory configured to process the data batch includes the processor and memory configured, for each of the one or more estimated intermediate positions of the mobile device, to adjust the one or more estimated intermediate positions based on the new position before sending the data batch to the server, and
- wherein the processor and memory configured to determine a new position comprises the processor and memory configured to detect that the confidence measure associated with the new position of the mobile device meets or exceeds a threshold confidence, and
- wherein the confidence measure associated with the new position is higher than a confidence in each of the one or more estimated intermediate positions between the baseline position and the new position.

8. The mobile device of claim 7, wherein the one or more estimated intermediate positions are estimated from mobile device motion sensors.

9. The mobile device of claim 7, wherein the processor and memory configured to collect positioning data and wireless AP measurement data comprise the processor and memory configured to collect positioning data and wireless AP measurement data responsive to one or more of:
- a determination of a context of the mobile device, wherein the context comprises one or more of: location of mobile device, amount of data previously collected by the mobile device or within a particular location, rate of travel of the mobile device, or any combination thereof,
- a receipt of a server request for AP measurement,
- a device operation configuration,
- a transition event of the mobile device,
- a determination that mobile device positioning data reliability meets one or more criteria, or
- any combination thereof.

10. The mobile device of claim 7, wherein the processor and memory are configured to process the data batch in response to one or more of:
- a determination of a context of the mobile device, wherein the context comprises one or more of: location of mobile device, amount of data previously collected by the mobile device or within a particular location, rate of travel of the mobile device, or any combination thereof,
- a receipt of a request from a server to end a data batch,
- compliance with a batch configuration,
- a transition event of the mobile device,
- a determination that mobile device positioning data reliability will fall or has fallen below an acceptable limit,
- a determination that the confidence measure associated with the new position is higher than a confidence measure in one or more intermediate positions between the baseline position and the new position, or
- any combination thereof.

11. The mobile device of claim 7, wherein the processor and memory configured to adjust the one or more estimated intermediate positions comprises the processor and memory configured to backfilter positioning data from the new position back to the baseline position.

12. The mobile device of claim 7, wherein the wireless AP measurement data comprises one or more of: RSSI, RTT, MAC address, or any combination thereof.

13. A machine-readable non-transitory storage medium having stored therein program instructions that are executable by a processor to perform operations comprising:
- receiving, from a server, a batch configuration including instructions as to when to initiate a first positioning method and when to determine position fixes using a global navigation satellite system (GNSS) positioning method;
- collecting, using the first positioning method and beginning at a baseline position of a mobile device, positioning data and wireless access point (AP) measurement data;
- using the GNSS positioning method, determining a new position of the mobile device and a confidence measure associated with the new position of the mobile device, wherein the confidence measure indicates a relative accuracy of the new position of the mobile device;
- in response to determining the new position of the mobile device, processing a data batch for sending to the server, wherein the data batch includes one or more estimated intermediate positions of the mobile device, based on data from positioning data and wireless AP measurement data collected, using the first positioning method, between the baseline position and the new position; and sending the processed data batch to the server, wherein processing the data batch includes, for each of the one or more estimated intermediate positions of the mobile device, adjusting the estimated intermediate position based on the new position before sending the data batch to the server, and wherein determining the new position comprises detecting that the confidence measure associated with the new position of the mobile device meets or exceeds a threshold confidence, and wherein the confidence measure associated with the new position is higher than a confidence in each of the one or more estimated intermediate positions between the baseline position and the new position.

14. The medium of claim 13, wherein the one or more estimated intermediate positions are estimated from mobile device motion sensors.

15. The medium of claim 13, wherein the collecting positioning data and the wireless AP measurement data comprises collecting positioning data and the wireless AP measurement data responsive to one or more of:
a determination of a context of the mobile device, wherein the context comprises one or more of: location of mobile device, amount of data previously collected by the mobile device or within a particular location, rate of travel of the mobile device, or any combination thereof,
a receipt of a server request for AP measurement,
a device operation configuration,
a transition event of the mobile device,
a determination that mobile device positioning data reliability meets one or more criteria, or
any combination thereof.

16. The medium of claim 13, wherein the processing the data batch is also in response to one or more of:
a determination of a context of the mobile device, wherein the context comprises one or more of: location of mobile device, amount of data previously collected by the mobile device or within a particular location, rate of travel of the mobile device, or any combination thereof,
a receipt of a request from a server to end a data batch,
compliance with a batch configuration,
a transition event of the mobile device,
a determination that mobile device positioning data reliability will fall or has fallen below an acceptable limit,
a determination that the confidence measure associated with the new position is higher than a confidence measure in one or more intermediate positions between the baseline position and the new position, or
any combination thereof.

17. The medium of claim 13, wherein the adjusting includes backfiltering positioning data from the new position back to the baseline position.

18. The medium of claim 13, wherein the wireless AP measurement data comprises one or more of: RSSI, RTT, MAC address, or any combination thereof.

19. An apparatus for performing measurement batching, the apparatus comprising:
means for receiving, from a server, a batch configuration including instructions as to when to initiate a first positioning method and when to determine position fixes using a global navigation satellite system (GNSS) positioning method;
means for collecting, using the first positioning method and beginning at a baseline position of a mobile device, positioning data and wireless access point (AP) measurement data;
means for determining, using the GNSS positioning method, a new position of the mobile device and a confidence measure associated with the new position of the mobile device, wherein the confidence measure indicates a relative accuracy of the new position of the mobile device;
means for, in response to determining the new position of the mobile device, processing a data batch for sending to the server, wherein the data batch includes one or more estimated intermediate positions of the mobile device, based on data from positioning data and wireless AP measurement data collected, using the first positioning method, between the baseline position and the new position; and
means for sending the processed data batch to the server,
wherein the means for processing the data batch includes, for each of the one or more estimated intermediate positions of the mobile device, means for adjusting the estimated intermediate position based on the new position before sending the data batch to the server, and
wherein the means for determining a new position comprises means for detecting that the confidence measure associated with the new position of the mobile device meets or exceeds a threshold confidence, and
wherein the confidence measure associated with the new position is higher than a confidence in each of the one or more estimated intermediate positions between the baseline position and the new position.

20. The apparatus of claim 19, wherein the one or more estimated intermediate positions are estimated from mobile device motion sensors.

21. The apparatus of claim 19, wherein the means for collecting positioning data and the wireless AP measurement data comprises means for collecting positioning data and the wireless AP measurement data in response to one or more of:
a determination of a context of the mobile device, wherein the context comprises one or more of: location of mobile device, amount of data previously collected by the mobile device or within a particular location, rate of travel of the mobile device, or any combination thereof,
a receipt of a server request for AP measurement,
a device operation configuration,
a transition event of the mobile device,
a determination that mobile device positioning data reliability meets a criteria, or
any combination thereof.

22. The apparatus of claim 19, wherein the means for processing the data batch comprise means for processing the data batch in response to one or more of:
a determination of a context of the mobile device, wherein the context comprises one or more of: location of mobile device, amount of data previously collected by the mobile device or within a particular location, rate of travel of the mobile device, or any combination thereof,
a receipt of a request from a server to end a data batch,
compliance with a batch configuration,
a transition event of the mobile device,
a determination that mobile device positioning data reliability will fall or has fallen below an acceptable limit,
a determination that the confidence measure associated with the new position is higher than a confidence measure in one or more intermediate positions between the baseline position and the new position, or
any combination thereof.

* * * * *